(12) United States Patent
Dougherty et al.

(10) Patent No.: US 6,287,488 B1
(45) Date of Patent: Sep. 11, 2001

(54) METHOD FOR INJECTION MOLDING OF HIGH QUALITY PARTS

(75) Inventors: Thomas J. Dougherty, 1222 Venetia Dr., Spring Hill, FL (US) 34608; Thomas C. Dougherty, St. Petersburg, FL (US)

(73) Assignee: Thomas J. Dougherty, Spring Hill, FL (US)

( * ) Notice: Subject to any disclaimer, the term of this patent is extended or adjusted under 35 U.S.C. 154(b) by 0 days.

(21) Appl. No.: 09/240,711

(22) Filed: Feb. 2, 1999

Related U.S. Application Data
(60) Provisional application No. 60/073,366, filed on Feb. 2, 1998.

(51) Int. Cl.[7] .................................................. B29C 45/56
(52) U.S. Cl. ........................................ 264/2.2; 264/328.7
(58) Field of Search ................................ 264/328.7, 2.2, 264/102; 425/808, 810, 150

(56) References Cited

U.S. PATENT DOCUMENTS

| | | |
|---|---|---|
| 3,577,596 | 5/1971 | Bullard et al. . |
| 4,013,392 | 3/1977 | Smith . |
| 4,249,880 | 2/1981 | Wohlrab . |
| 4,589,830 | 5/1986 | Clawson . |
| 4,828,769 | 5/1989 | Maus et al. . |
| 4,959,191 | 9/1990 | Yoshioka et al. . |
| 4,981,634 * | 1/1991 | Maus et al. ............................. 264/334 |
| 4,990,084 | 2/1991 | Reinhart . |
| 5,093,049 * | 3/1992 | Uehara et al. ......................... 264/2.2 |
| 5,252,053 | 10/1993 | Schraven et al. . |
| 5,352,394 | 10/1994 | Fujita et al. . |
| 5,399,303 * | 3/1995 | Yamaguchi et al. ................... 264/2.2 |
| 5,529,483 | 6/1996 | Abe et al. . |
| 5,609,801 | 3/1997 | Arai . |
| 5,948,327 * | 9/1999 | Saito et al. ............................. 264/2.2 |
| 5,972,252 * | 10/1999 | Saito et al. ............................. 264/2.2 |
| 6,024,902 * | 2/2000 | Maus et al. ............................. 264/2.2 |

FOREIGN PATENT DOCUMENTS

| | | |
|---|---|---|
| 27 29 409A1 | 1/1978 | (DE) . |
| 60-110419 | 6/1985 | (JP) . |
| 923857 | 4/1982 | (SU) . |

* cited by examiner

*Primary Examiner*—Jill L. Heitbrink
(74) *Attorney, Agent, or Firm*—Arent Fox Kintner Plotkin & Kahn PLLC

(57) ABSTRACT

A method and apparatus for injection molding of high quality thermoplastic parts is such that a conventional movable mold half is mounted on a movable platen of the injection molding machine, and a special stationary mold half is mounted on the stationary platen. The stationary mold half includes a stationary plate secured to the stationary platen, with the stationary plate including stationary mold inserts. Each stationary mold insert has a stationary mold insert surface. An A-half parting line plate is movably attached to the stationary plate, with the A-half parting line plate being movable with respect to the stationary plate and the stationary mold inserts. A driving device, such as a hydraulic cylinder, is disposed between the stationary plate and the A-half parting line plate, with the driving device driving the A-half parting line plate toward and away from the stationary plate. A control circuit is provided for controlling the driving device to control a movement of the A-half parting line plate with respect to the stationary plate.

9 Claims, 9 Drawing Sheets

METHOD FOR INJECTION MOLDING OF HIGH QUALITY PARTS

This application claims the benefit of U.S. Provisional Application No. 60/073,366, filed Feb. 2, 1998.

BACKGROUND OF THE INVENTION

1. Field of the Invention

The present invention is related to a method and an apparatus for injection molding of thermoplastic parts which require very high quality, such as optical lenses and optical disks.

2. Description of the Related Art

Optical lenses and optical disks are frequently injection molded from a thermoplastic material. Due to the optical nature of these parts, however, as it is imperative that the molded parts have a very high mold quality as well as very fine surfaces, conventional injection molding techniques are not acceptable. Any imperfections in the molded part can destroy its usability. Moreover, injection molding of parts such as optical lenses which can contain extreme variation in thickness from an edge of the part to a center of the part, and specifically parts which are very thin toward the center and thick around the outside edges thereof, can present significant difficulties in the molding process. If the edge periphery of the part is many times greater than the thickness in the central area of the part, the part can be very difficult to mold due to the fact that molten material will follow the path of least resistance and travel around the thicker outer edge of the part, creating a void or imperfections in the center portion thereof. An edge thickness to center thickness ratio of 5:1 or 6:1 can be impossible to mold with conventional injection molding techniques.

Typically, molded parts such as lenses having such a thickness ratio are "gated" from one side. This allows injected material such as molten plastic material to flow across the mold cavity area in such a way as to push air or gas in the cavity in front of the molten material toward the opposite side of the cavity. The initial molten material entering the mold cavity, plus the entrapped air or gas, are pushed beyond the opposite edge of the molded part area of the cavity into an overflow well or tab. This configuration is known to dramatically reduce or eliminate weld lines within the parts, and can eliminate or reduce entrapped air or gas within the material which forms the actual part. The gate material and the overflow tab material remain attached to the part after being ejected from the mold, and can be subsequently trimmed off.

In the case of rounded parts such as optical lenses, however, where the edge portion is much thicker than the center portion, the injected material following the wider edge portion more rapidly completes the circle through the thicker edge portion, and can entrap air or gas within the center of the part. A vent relief pin cannot be used for optical parts, since an unacceptable pin mark would remain in the center portion of the part. It has been known that one way to avoid the creation of this "void" is to utilize a method of injection molding wherein the central thickness area of the cavity is temporarily enlarged in the molding process, so that the cavity is enlarged in order to permit molten material to appropriately flow over the thinner areas during the fill cycle of the injection process, and then to subsequently clamp or close the mold so that the mold cavities are brought to the desired final size. U.S. Pat. No. 4,828,769, which is hereby incorporated by reference, discloses one such method for injection molding articles such as lenses which utilizes a temporary enlargement of the mold cavity in the injection process. The process is referred to as "coining" or clamp-end compression. According to the method disclosed in the '769 patent, an injection molding machine is provided wherein a stationary platen supports a stationary or "A" half of an injection mold, and a movable platen which supports a movable or "B" half of the mold. FIG. 1 illustrates a mold system of the present invention disposed in a conventional injection molding machine 1. As shown in FIG. 1, movable platen 10 is moved by a moving device such as hydraulic piston 11, and is guided by a series of tie rods 12 toward stationary platen 13. Conventional coining procedures such as that disclosed in the '769 patent require injection of an amount of molten material which is slightly greater than the molten material which is actually required to form the part, in order to fill or substantially fill the enlarged cavity area. A "toggle type" injection molding clamping action then takes place in the '769 patent, wherein further movement of the movable platen occurs after injection, to pressurize the material in the cavities, and to bring the cavities to the desired shape of the finished parts. The excess material in the cavities is driven into pressure relief ports in the mold. The stationary or A-half of the mold is appropriately configured with a sprue bushing, such that the stationary mold half, the sprue bushing, the stationary platen, and the injection nozzle are held in a stationary relationship throughout the entire molding operation. The '769 patent, and the other prior art in the area of "coining", requires a specialized configuration for the movable platen so as to first move the movable platen into a first or softclose position, and then to secondarily move or toggle the movable mold half attached to a clamping plate within the movable mold half, to complete the molding process. This movement of the clamping plate moves mold insert on the movable platen toward the surface on the stationary platen, thereby pressurizing the injection shot in the mold cavity while bringing the mold inserts to that final position. The injection while the movable platen is in the soft-close position enables the molten material to flow over the center, thinner portion of the mold while the mold is expanded. Since the expanded mold has an edge thickness to center thickness ratio which is much lower than 5:1, molten material can easily flow over the center of the mold cavity. The prior art, therefore, requires a complex and specialized mold machine configuration to accommodate the complex movable mold half toward the stationary mold half in the compression stroke.

SUMMARY OF THE INVENTION

The present invention is directed to a method and apparatus for molding high quality parts such as optical lenses and optical disks wherein an essentially conventional injection molding machine can be used, and wherein a specialized mold configuration is provided such that the conventionally "stationary" mold half is provided with a stationary portion and a movable portion, movable relative to each other, and a series of driving elements which drive the movable portion of the stationary mold half toward and/or away from the movable mold half during a special coining stroke. A separate driving and control system is provided for the mold assembly, which does not interfere with the operation of the molding machine. The presently preferred embodiment of the invention utilizes specialized hydraulic pistons to move the "A" half of the mold toward and away from the stationary platen. Actual stroke distance of the hydraulic pistons can be adjusted through the use of a handwheel and appropriate adjustment mechanism, which utilizes a worm screw and adjustment wedge configuration.

An appropriate hydraulic power unit and hydraulic circuit is provided, and an LVDT (linear variable-differential transformer) encoder is used to monitor movement between the movable portion of the stationary mold half and the stationary portion of the stationary mold half, and provides information on this movement to a control circuit. A control system is provided which controls the operation of the specialized mold assembly, as noted previously, in a manner which is completely separate from, but is interlocked with the control system of the injection molding machine.

A method of injection molding a high quality part utilizing a method and apparatus of the present invention is such that a specialized mold is placed in the mold-receiving bay of a conventional injection molding machine. The stationary portion of the "stationary" half of the mold, which will hereinafter be referred to as a hydraulic cylinder plate or stationary plate, is bolted or otherwise appropriately affixed to the stationary platen of the injection molding machine, and the movable portion of the stationary half of the mold, hereinafter referred to as the A-half parting line plate, is attached to the hydraulic cylinder plate by rod ends of pistons of the hydraulic cylinders. The conventional movable half or B-half of the mold is appropriately affixed to the movable platen of the injection molding machine, and has a B-half parting line plate thereupon. The A-half parting line plate is appropriately adjusted to have an appropriate stop position so that the collapse of the hydraulic pistons during the coining stroke moves the A-half parting line plate so that the mold cavity is the proper size after the coining stroke. The size of the mold cavity varies with the movement of the A-half parting line plate due to the fact that fixed to the hydraulic cylinder plate are a plurality of stationary mold inserts provided on mold insert supports. Corresponding movable mold inserts are provided on the movable mold half, thereby forming mold cavity and core sets when the mold halves are joined. The mold insert supports on the stationary hydraulic cylinder plate have a cross-sectional shape which correspond to openings in the A-half parting line plate, such that the A-half parting line plate slides over the inserts and insert supports. As the A-half parting line plate is therefore movable with respect to the hydraulic cylinder plate, a depth or thickness of the mold cavity varies. The necessary hydraulic circuits and control circuits must be provided with respect to the stationary half of the mold in order to appropriately control operation. In order to ensure a balanced application of force on the injection side plate assembly, the hydraulic cylinders are connected to a common oil or fluid source. With the parting line plate fully extended, and with appropriate cleanliness procedures having been taken in order to maintain surface quality of the molded parts, the movable platen is moved toward the injection side mold half until the parting line surface of the B-half parting line plate contacts the parting line surface of the A-half parting line plate. The movable mold half is continually pressurized, and stops while the injection shot begins. During this period, the movable mold half is considered to be at an intermediate stop position. Injection continues until a sizable percentage of the required shot, such as 94–96%, is completed. After the desired percentage of the shot is injected, and after a counterpressure provided by the continual pressurization of the movable mold half has reached a predetermined value, hydraulic pressure which maintains the extension of the hydraulic pistons extending the A-half parting line plate is vented, thereby enabling the movable mold half to push the A-half parting line plate toward the hydraulic cylinder plate. This movement, therefore, further drives the insert surfaces on the movable half toward the cavity surfaces on the hydraulic cylinder plate, until the A-half parting line plate is moved to the final clamp position. During this "coining" stroke, the remaining portion of the injection shot is injected, so that after the completion of this coining stroke, 100% of the shot has been injected. The runner system of the mold is configured such that any excess injection shot can be vented backwards through the runner system, into the injection cylinder. The injection cylinder remains in contact with the sprue bushing in the mold during the entire injection procedure, taking advantage of the axial movement which is provided by the injection cylinder on a conventional injection molding machine.

After appropriate cooling, the movable platen of the injection molding machine is moved away from the parting line plate, and a signal is generated to the auxiliary hydraulic system for the mold assembly of the invention in order to extend the auxiliary hydraulic pistons immediately after the mold has opened, thereby effectively extending the A-half parting line plate assembly to the preadjusted position. The mold can be provided with an ejector plate and ejector pins which utilize the ejector plate motion system of the injection molding machine to effectively eject the molded parts and runner system from the mold. A configuration according to the invention provides high quality plastic parts in a simplified device which requires no moving hydraulic hoses or electrical lines to be connected with respect to the movable platen. All of the hydraulics and electronics associated with the present invention are disposed on the stationary side, or with respect to the stationary platen of the injection molding machine. The hydraulic nature of the invention enables highly precise control of the mold halves, and therefore the molding process. Additionally, due to the precise control and the requirement of only 100% of the required shot, less plastic or molten material is required for each injection shot.

DETAILED DESCRIPTION OF THE PREFERRED EMBODIMENT

Figure 1:
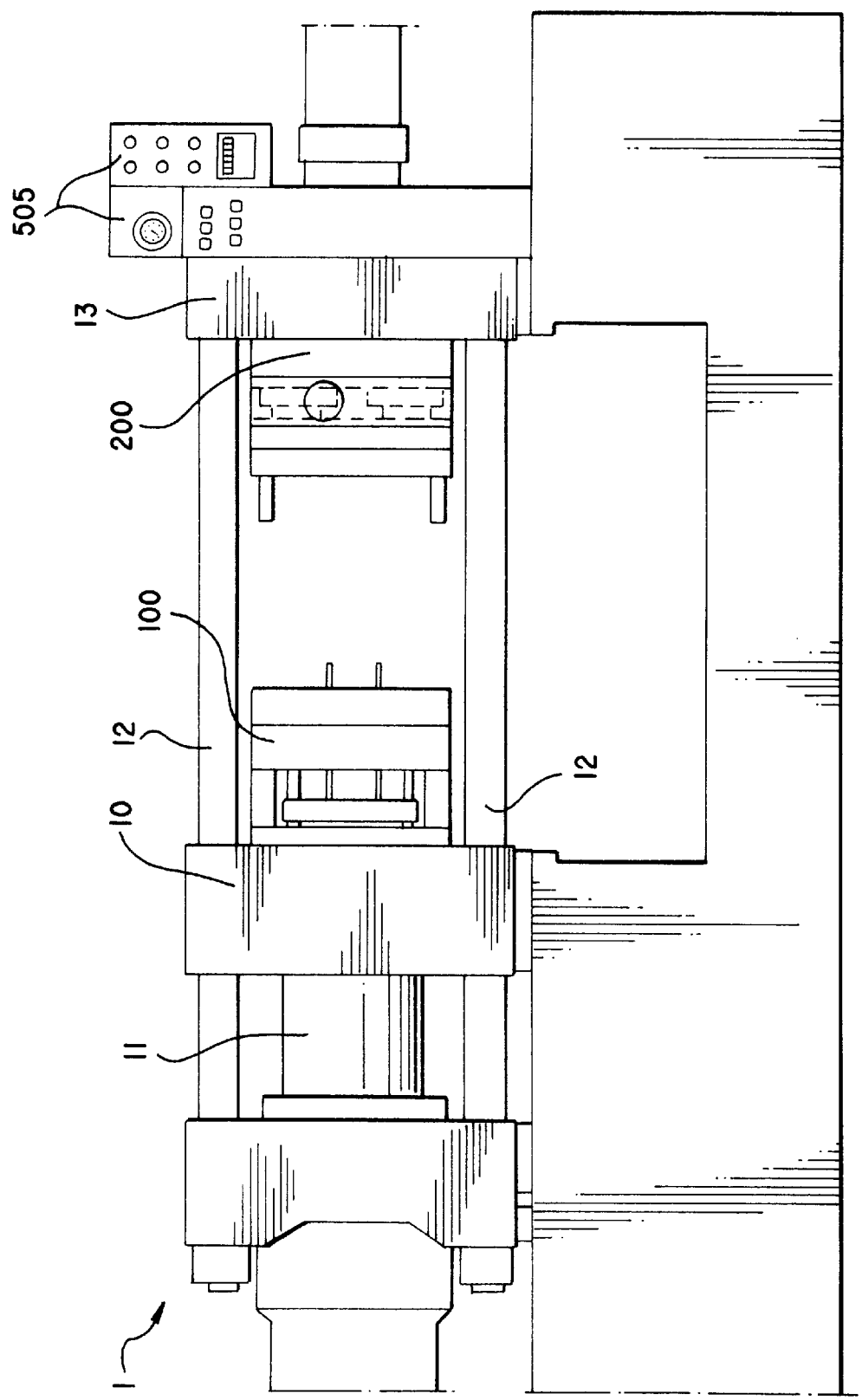
FIG. 1 illustrates a mold system of the present invention disposed within a mold bay of a conventional injection molding machine.
Figure 3:
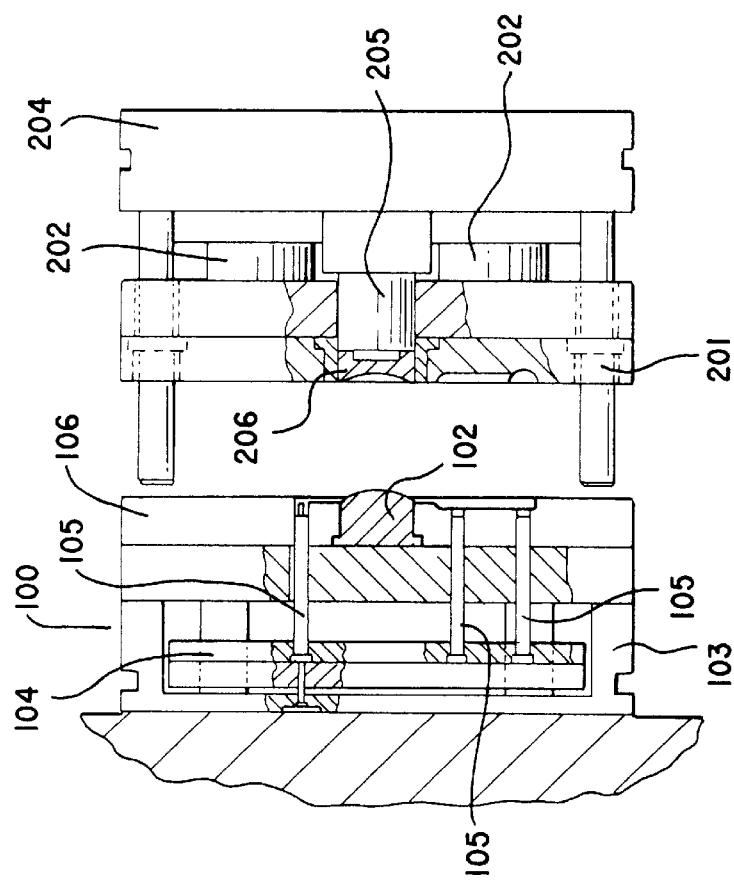
FIG. 3 is a side view of the present invention, with some of the mold cavity detail shown in cross-section.
Figure 2:
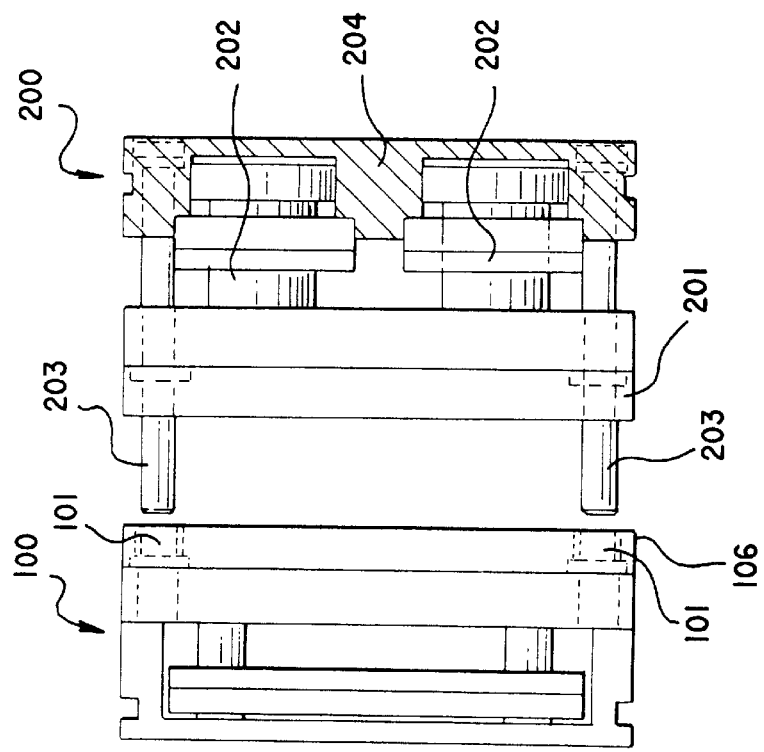
FIG. 2 generally illustrates a side view of the two mold halves of a mold system according to the present invention.
Figure 4:
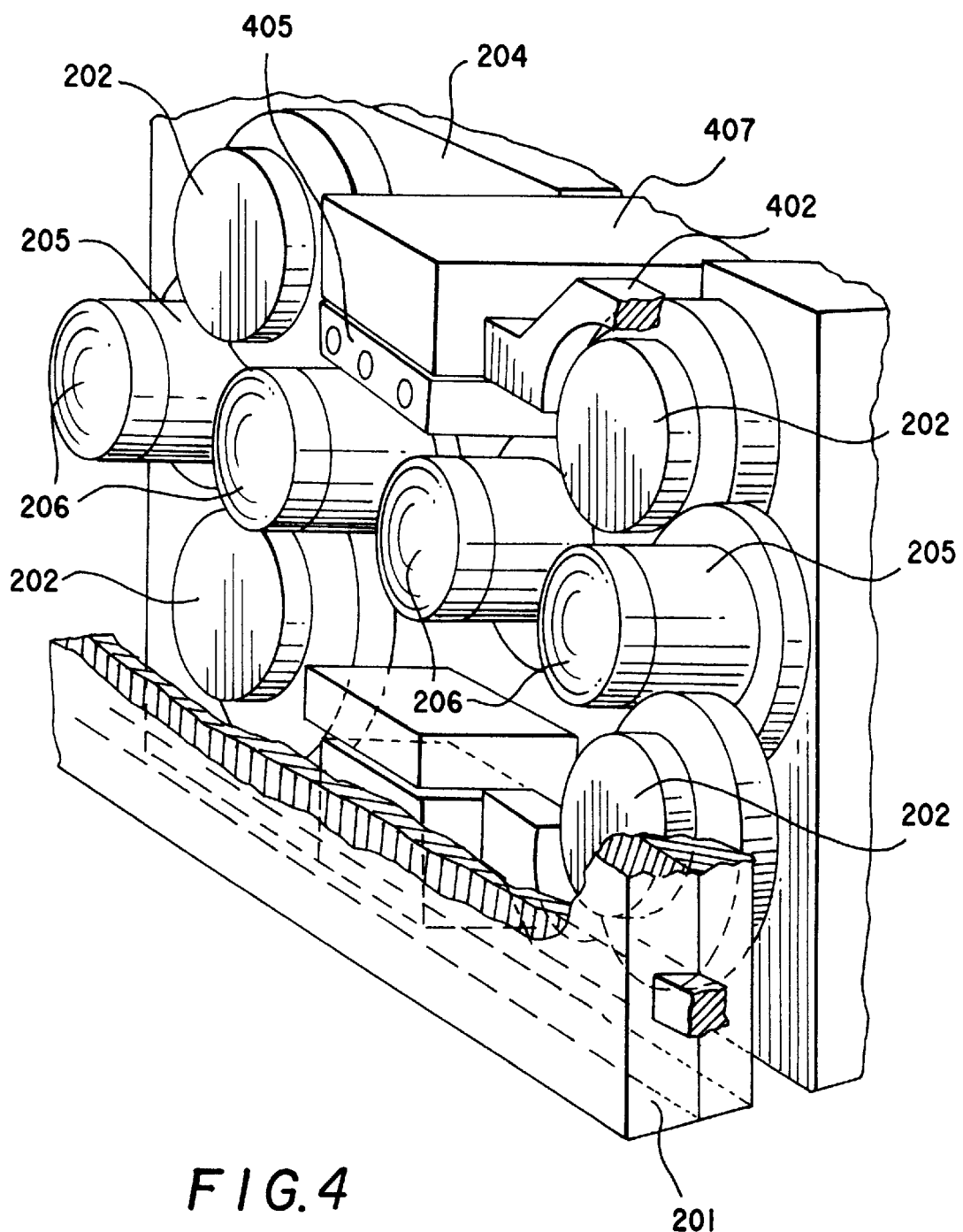
FIG. 4 is a perspective view of the stationary hydraulic plate of the present invention, with the A-half parting line plate cut away.

Before a complete discussion of the present invention can be properly understood, certain definitions must be provided in order to ensure that the present invention is properly understood.

"Injection molding machine", unless otherwise identified, refers to a modern conventional industrial injection molding machine with electronic platen motion sequence controls and having a fully hydraulic movable platen motion as opposed to toggle type, a stationary platen, tie rods or stress frame, injection nozzle, injection heating cylinder, and other elements which are necessary to perform injection molding of molten thermoplastic materials.

"Moving platen" is also conventionally referred to as a "B" side of the injection molding machine, and is typically movable either with a mechanical driving unit or a hydraulic driving unit, so as to be movable along the tie rods or machine platen alignment system toward and away from the stationary platen.

"Stationary platen", also known as the A-side of the injection molding machine, is a stationary plate on a conventional molding machine which is typically configured to receive a stationary or non-moving mold half of an injection mold, and which is configured with respect to the injection nozzle so as to enable injection of molten material into the stationary mold half. In the prior art, stationary mold halves are thusly referred to due to the fact that they are attached to the stationary platen, and are stationary. The present invention utilizes a stationary mold half in that it is attached to the stationary platen; however, the stationary mold half of the present invention includes movable portions thereof in order to provide the coining stroke, as will be discussed below.

"Movable platen driving unit" refers to a conventional hydraulic or mechanical driving device which drives the movable platen toward and away from the stationary platen in a conventional molding machine.

"Auxiliary hydraulic circuit" refers to the hydraulic circuit according to the present invention which operates either in conjunction with or independent from a driving system of the injection molding machine in order to drive the injection side mold half of the present invention.

"Hydraulic cylinder plate" or stationary plate refers to the portion of the stationary mold half according to the present invention which is fixed to the stationary platen of a conventional injection molding machine.

"A-half parting line plate" is the portion of the invention which is movable with respect to the hydraulic cylinder plate as part of the coining operation.

"B-half parting line plate" is the opposing portion to the A-half parting line plate, and is part of the movable mold half.

"Injection side driving unit" refers to elements of the present invention which enable the parting line plate to be moved relative to the stationary plate.

"Mold insert supports" refers to stationary units which are either part of or fixed to the hydraulic cylinder plate, which secure the stationary mold inserts thereto, so that the A-half parting line plate is movable with respect to the stationary mold inserts.

Figure 5:
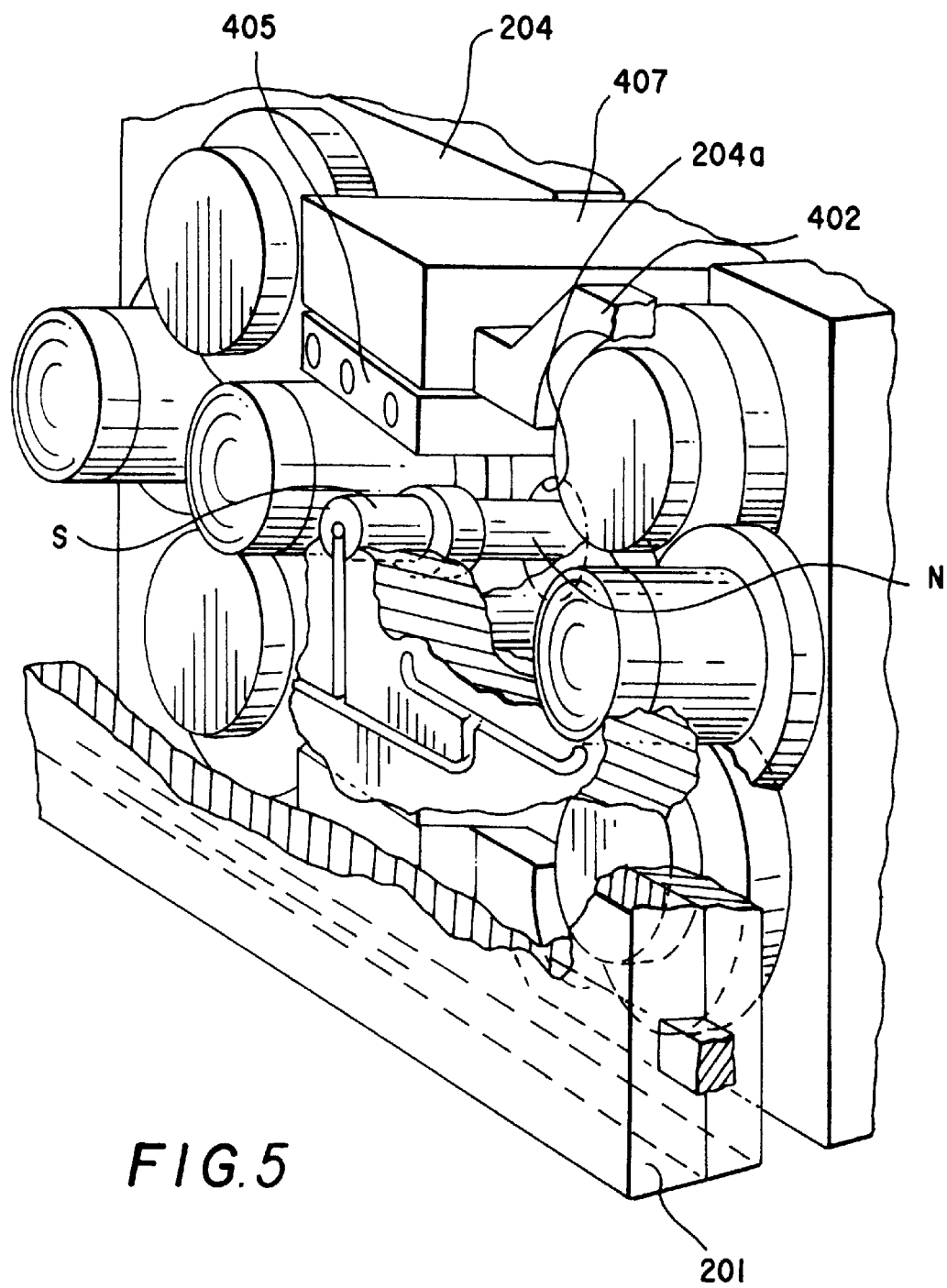
FIG. 5 is similar to FIG. 4, but illustrates a portion of the runner system in the A-half parting line plate.
Figure 6:
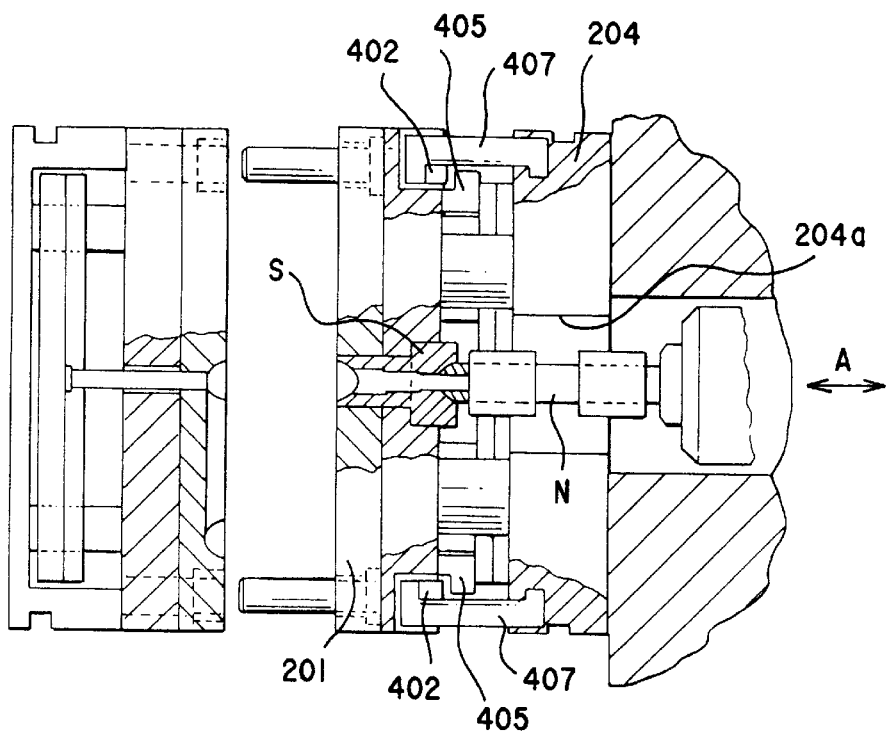
FIG. 6 is a partial cross-sectional view of the present invention, illustrating the injection nozzle, sprue bushing, and adjustment mechanisms.
Figure 12:
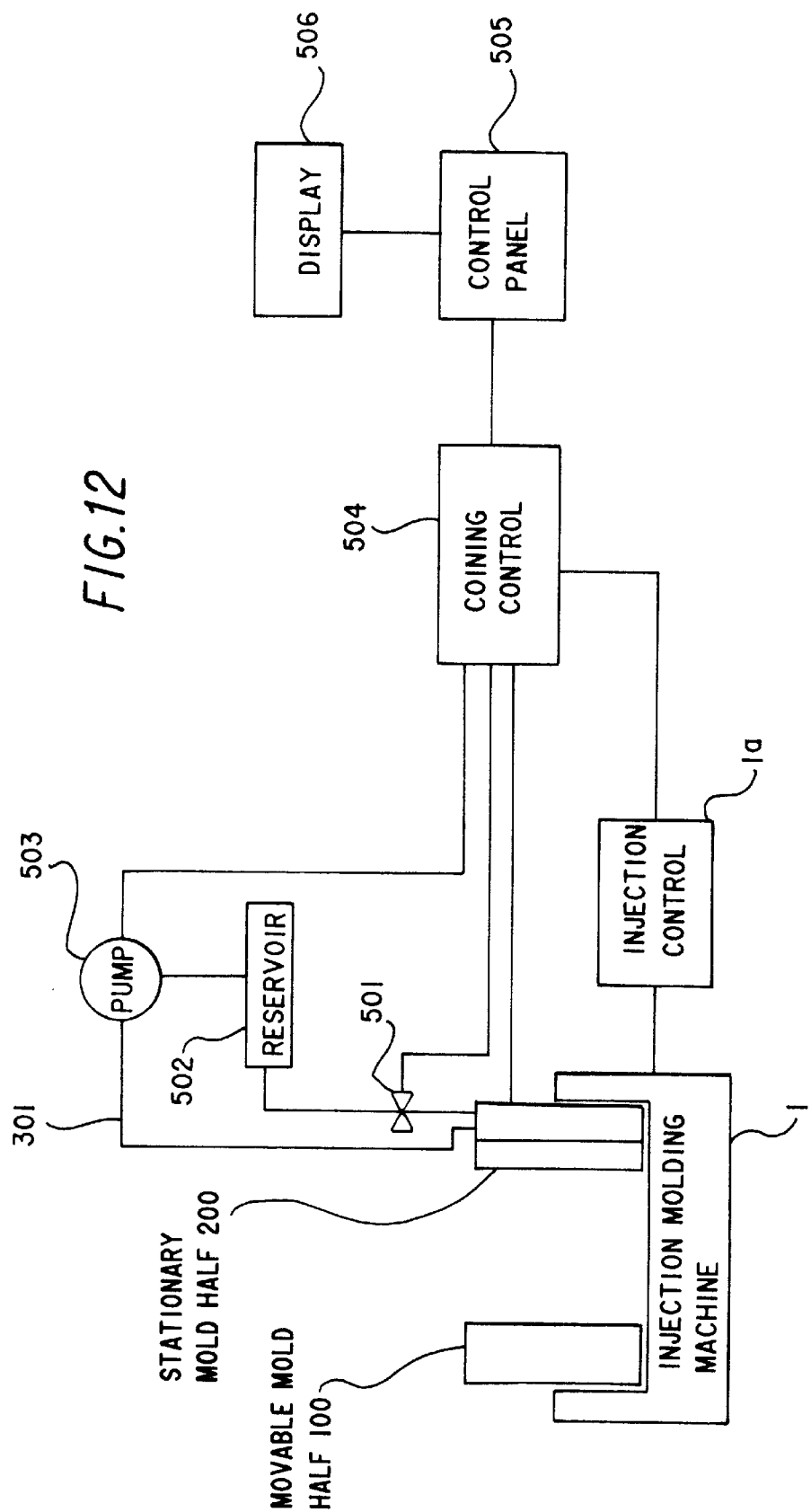
FIG. 12 is a schematic diagram of the functional elements of the present invention.

Referring once again to FIG. 1, as well as the remainder of the drawings, movable mold half 100 is attached to movable platen 10 by a suitable means such as bolting or clamping. Stationary mold half 200 is attached to stationary platen 13 by a similar method. Movable platen 10 and movable mold half 100 are movable by the hydraulic piston or movable plate driving unit 11. Referring now to FIGS. 2–5, stationary mold half 200 includes a movable A-half parting line plate 201, which is movably supported by a plurality of hydraulic pistons 202 in a linear fashion along guide pins 203. Guide posts 203 are received in guide post bushings or receiving apertures 101 within B-half parting line plate 106 of movable platen 100 during a clamping process. Hydraulic pistons 202 are mounted to stationary plate or hydraulic cylinder plate 204, which is in turn mounted to stationary platen 13 of the injection molding machine. Also fixed to stationary plate 204 is a plurality of stationary mold insert supports 205, which have stationary mold inserts 206 mounted thereto. Movable mold half 100 has corresponding movable mold inserts or cores 102 mounted thereto, such that opposing mold insert surfaces 102 and 206 form mold cavities during the injection molding process. Movable mold half 100 may also include an ejector housing 103, a movable ejector plate 104, and ejector pins 105 for ejecting molded parts. Movement of ejector plate 104 is controlled in a conventional manner as is known in the art. Referring to FIGS. 5 and 6, stationary plate 204 includes an opening 204a therein, to allow injection nozzle N of injection molding machine 1 to protrude therethrough, and engage with sprue bushing S which is attached to parting line plate 201. As is known in the art, injection nozzle N is axially movable with respect to the injection molding machine in direction A (FIG. 6). This axial movement is typically used to enable proper static alignment of the injection nozzle with the sprue bushing. The invention further takes advantage of this movement by moving the A-half parting line plate during the coining stroke, which in turn moves the injection nozzle as part of the coining stroke. This movement of parting line plate 201 and nozzle N keeps sprue bushing S in contact with nozzle N. FIGS. 1 and 12 illustrate control panel 505, which may include a hydraulic pressure gauge, and a control panel for adjusting and controlling certain aspects of the present invention.

Figure 10:
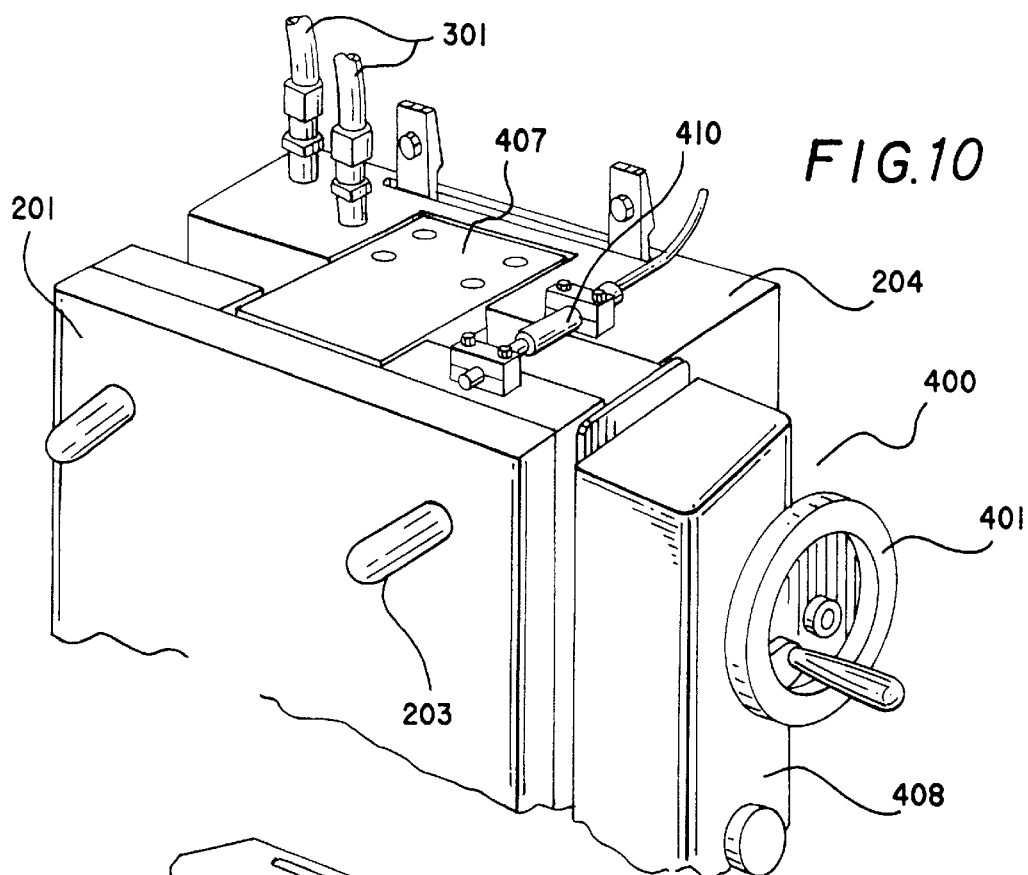
FIG. 10 is a partial perspective view of the stationary mold half of the present invention.
Figure 11:
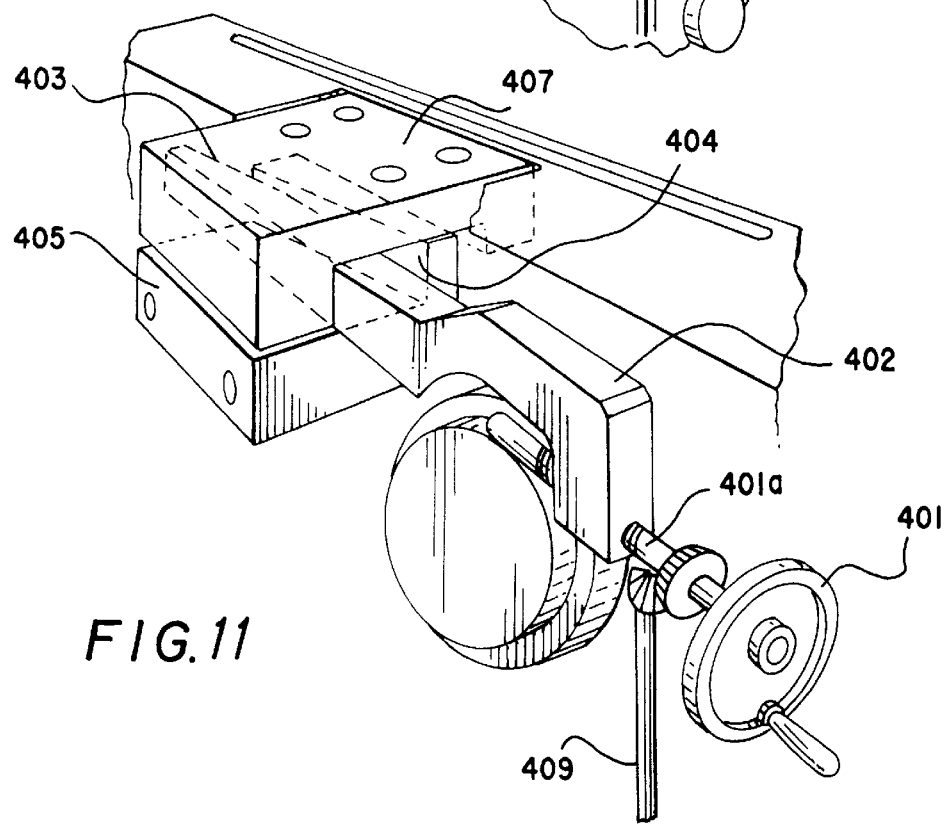
FIG. 11 is a detailed view of an element of the adjustment mechanism of the present invention.

FIG. 10 is a perspective view of a portion of stationary mold half 200, with A-half parting line plate 201 and stationary plate 204. Hydraulic control of the pistons 202 is provided by hydraulic hoses 301, which are connected to an appropriate hydraulic circuit. In order to ensure an even balance of pressure among the plurality of hydraulic cylinders 202, each of the hydraulic cylinders can be commonly connected to the hydraulic circuit. In order to adjust an appropriate stroke distance between parting line plate 201 and stationary plate 204, adjustment mechanism 400 is provided. Adjustment mechanism 400 includes a handwheel 401, which is connected, as shown in FIG. 11, to an angled element 402 having an angled surface 403 thereupon. Angled surface 403 is intended to engage a corresponding angled surface 404 of angled block 405, which is fixed to the parting line plate. The angled surfaces can have corresponding angles of, for example, 9°. Rotation of handwheel 401 results in rotation of threaded rod 401a, which linearly moves adjustment element 402, so that angled surfaces 403 and 404 engage at different portions thereof. Adjustment element 402 engages a flat surface of U-shaped block 407, which is secured to stationary plate 204. In order to ensure stable linear movement and adjustment of A-half parting line plate 201, a second complimentary angled block, U block, and adjustment element (not shown) is provided on the bottom portion of the stationary mold half. A gear box mechanism 408 is utilized to ensure that rotation of handwheel 401 and threaded rod 401a is appropriately communicated via connecting rod 409 to the lower adjustment mechanism. LVDT (linear variable-differential transformer) encoder 410 is attached to stationary plate 204 and A-half parting line plate 201, in order to provide signals to the control system regarding the position of A-half parting line plate 201 during adjustment, as well as during the coining stroke. This adjustment mechanism allows a user to control a maximum extension distance of parting line plate 201 by pistons 202. A maximum stroke of the hydraulic pistons on the stationary mold half, from full extension to full collapse, is very small, such as 0.5 inches, or even as small as 0.3 inches. In a preferred embodiment, the actual collapsed range is 0.03 to 0.06 inches, and the maximum stroke is 0.3 inches.

The present invention operates such that the movable mold half 100 is bolted or otherwise affixed to movable platen 10, and the stationary mold half 200 is bolted or affixed to stationary platen 13. Utilizing hydraulic hoses 301 and an appropriate control system, hydraulic and electrical control of the mold system can be obtained. At the beginning of the molding cycle, hydraulic cylinders 202 are placed in an extended position to extend the A-half parting line plate. The extended stop position of the A-half parting line plate is determined by the adjustment of handwheel 401, and the corresponding engagement of the angled surfaces 402 and 403. A relief valve 501 for the hydraulic circuit is provided, and may be adjustable, such that venting or relief of the pressure in the hydraulic circuit can be relieved at a predetermined point.

Referring to FIG. 12, pressure relief valve 501 is disposed in series with one of hydraulic hoses 301. In the case of an electrically adjustable value, pressure relief can be adjusted by coining control unit 504, which is provided with control panel 505 and may also be provided with a display 506. Hydraulic fluid vented from relief valve 501 is vented into tank or reservoir 502. As will be discussed later, an electrical or mechanical interlock is provided between injection molding machine 1 and the coining control unit 504. An electrical interlock may be provided through injection control unit 1a, as shown in FIG. 12.

Figure 7:
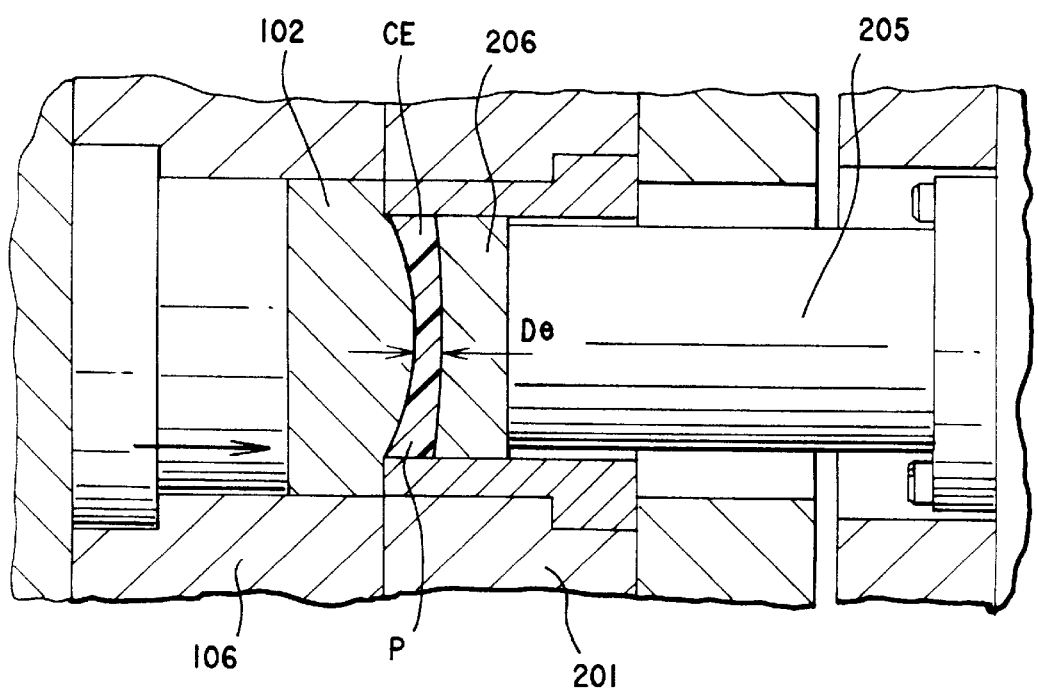
FIG. 7 is a sectional view of the mold cavity detail of the present invention, in the intermediate clamp position.
Figure 8:
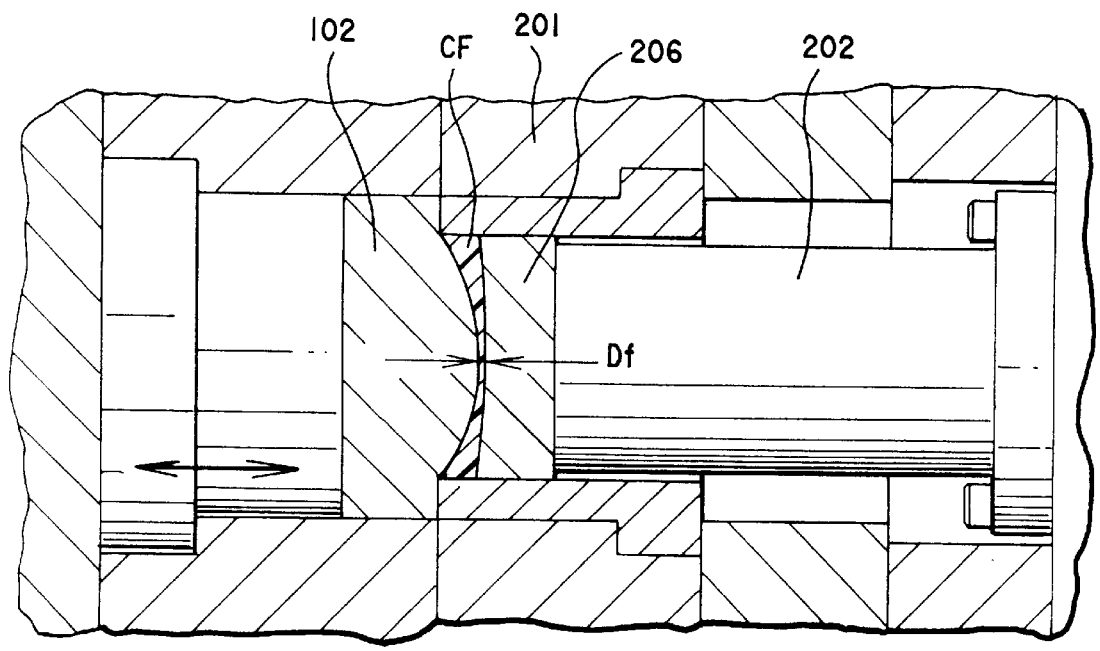
FIG. 8 is similar to FIG. 7, but shows the mold inserts in the final clamp position.
Figure 9:
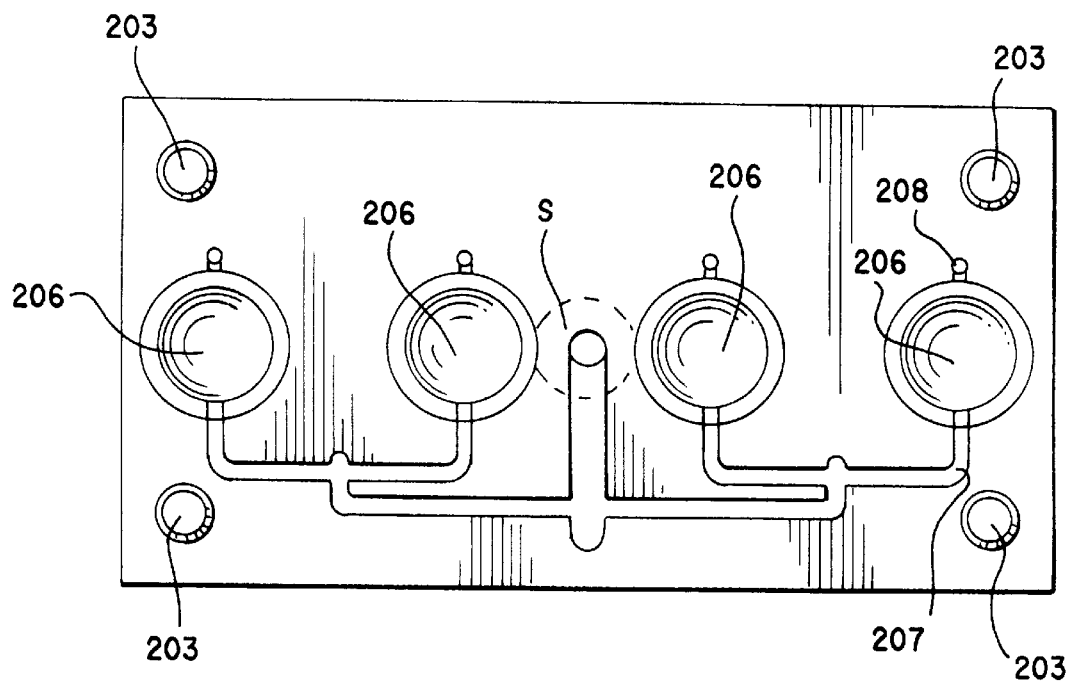
FIG. 9 is a front view of the A-half parting line plate of the present invention.

After the mold halves are in place, hydraulic and electrical circuits connected, and appropriate pre-injection steps having been followed, the movable platen containing the movable mold half is extended by movable platen driving unit 11 of injection molding machine 1, until guide posts 203 become engaged in guide post bushings 101, and the parting line surface of B-half parting line plate 106 and the parting line surface of A-half parting line plate 201 contact each other, as shown in FIG. 7. Because pistons 202 and parting line plate 201 are in the extended position, an expanded mold cavity CE, as shown in FIG. 7, is formed. Cavity CE has, at this intermediate clamp stop position, a cavity width We. At this time, after appropriate placement of injection nozzle N against sprue bushing S, and heating of the molten material within injection nozzle N, a predetermined percentage of the injection shot of molten material P is injected into mold cavity CE. The predetermined percentage is less than 100%, and typically 93–94% of the injection shot. The injection shot is calculated to be the amount of material necessary to fill runner system 207, and provide sufficient material to make the final molded part. As seen in FIG. 9, the runner system and mold cavities include overflow wells 207a, to allow material to flow thereto from the cavity, which significantly reduces weld lines and air bubbles. 100% of the injection shot is not and should not be calculated to be the amount necessary to fill cavity CE, but only to fill a final mold cavity CF. During injection, pressure is maintained by movable platen driving device 11 on the parting line surfaces. After the predetermined percentage of the required shot has been injected, the coining control unit 504 controls driving device 11 to begin a final coining stroke from the intermediate clamp stop position to the fully adjusted final clamp or mold close position. The movement of the movable platen driving device 11 is enabled by the pressure provided on A-half parting line plate 201 and hydraulic pistons 202 by the continued pressure from driving device 11, combined with pressure relief provided by valve 501. When the pressure in the hydraulic circuit exceeds the preset counterpressure on pressure relief valve 501, hydraulic fluid is vented from the pistons through the pressure relief valve 501 into reservoir 502, until A-half parting line plate 201 bottoms out against hydraulic plate 204. Appropriate stop blocks can be provided as contact points between the A-half parting line plate 201 and the stationary plate 204. FIG. 8 shows the elements of the invention in the final clamp position. In the final clamp position, final mold cavity CF is formed, having a much reduced cavity depth De, as clearly shown in FIG. 8. In the event that an excess of 100% of the molten material needed to fill the runner system, mold cavity CF, and overflow tabs 208 is injected, the runner system and gates are configured to have a sufficient capacity to allow the molten material to flow backwards through the gates, runner system, and sprue bushing into the injection nozzle, during the coining stroke. The invention, therefore, does not require adjustable compensating devices to receive any excess material, as is required by the prior art. As noted previously, conventional compression-type methods and systems require the injection of more than 100% of the injection shot, and rely upon pressure relief ports for relief of the excess material.

The mold halves are provided with appropriate cooling ports which may be needed to maintain the mold, runner system, and cavities at an appropriate temperature. After injection, the water flowing through the cooling system cools the molded plastic parts and the runner system, and the mold is controlled by the injection molding machine control system 1a, interlocked with control unit 504, to open, and the ejection cycle to begin. While the A-half parting line plate remains in the collapsed position, and is held in that position by hydraulic pressure based upon the position of a directional valve, the movable platen moves the movable mold half away from the stationary mold half. After this movement, the injection molding machine can provide an interlock signal to the controller for the mold system of the present invention, which actuates the directional valve in the hydraulic pump circuit to reverse the flow of oil to the cylinders, thereby extending the A-half parting line plate assembly, enabling the injection nozzle to once again extend to the initial position. Ejector plate 104 of the conventional movable mold half is then extended, advancing ejector pins 105, and ejecting the hardened molded part or parts from the cavities. It should be noted that as the A-half parting line plate is moved to the extended position, injection nozzle N axially moves along with the parting line plate, so that the nozzle remains in contact with the sprue bushing S.

Figure 13:
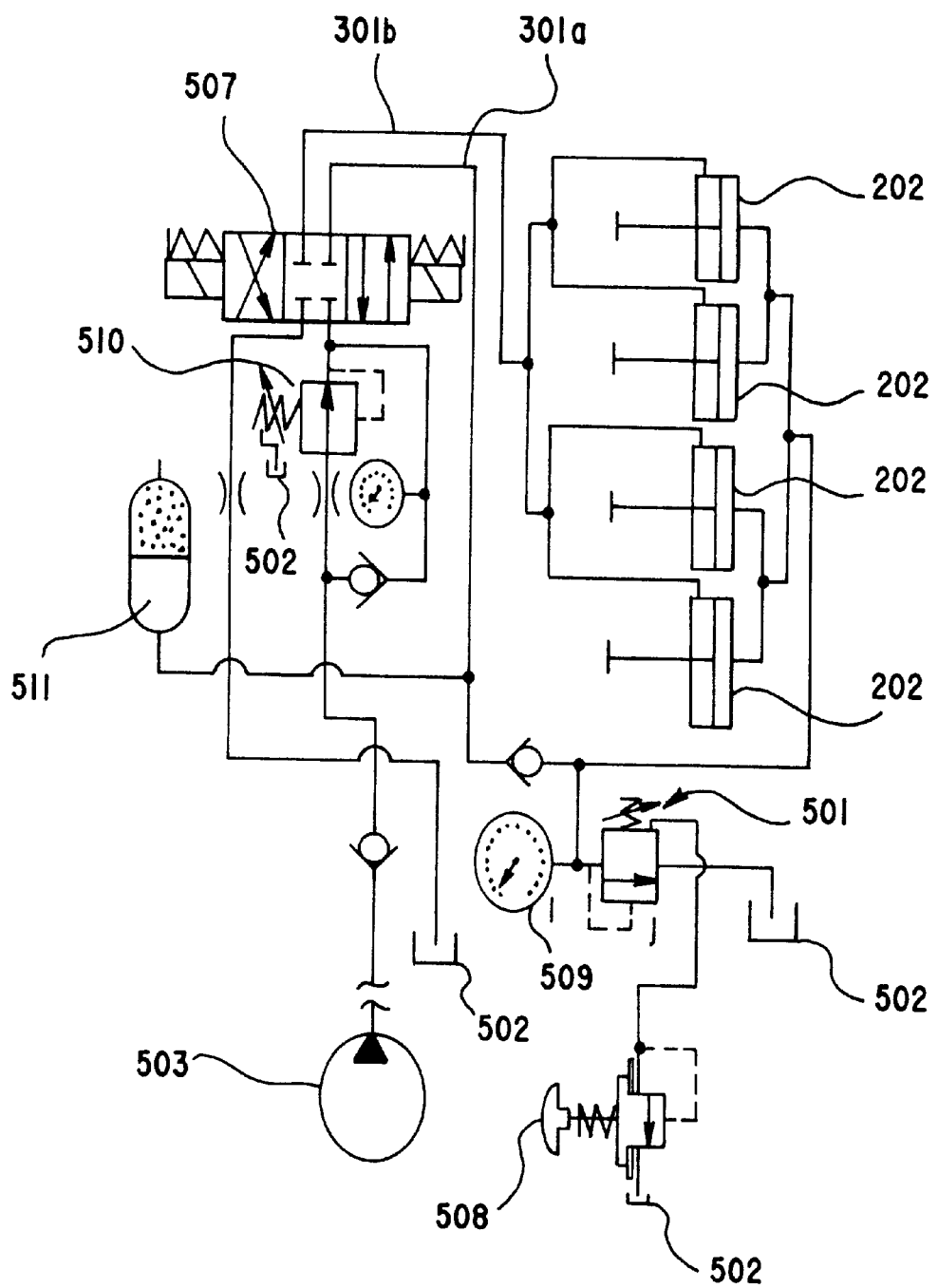
FIG. 13 is a schematic diagram of a hydraulic circuit for use with the present invention.

FIG. 13 illustrates a schematic diagram of a hydraulic circuit which can be used to control the present invention. Hydraulic pressure is provided by pump 503, solenoid valve 507, which is a three precision spring centered double solenoid directional valve, with all ports blocked in the center position, is controlled to shift either to the right or the left, to either extend or collapse hydraulic pistons 202. During an extension stroke, when the pistons are sought to be extended, the solenoid valve is shifted to the left, in a nonreversed state, so that hydraulic pressure from hydraulic fluid pumped by pump 503 travels through hydraulic line 301a to extend the hydraulic pistons; during a collapse cycle, as discussed above, the solenoid is shifted to the right, reversing the flow of the hydraulic fluid such that the pressurized fluid travels in hydraulic line 301b toward pistons 202, thereby collapsing the pistons. As discussed above with respect to the coining stroke, collapse of the pistons is controlled by initiation of pressure relief from pressure relief valve 501, with the precise pressure relief point being set by manual control knob 508. It should be noted that the relief point for pressure relief valve 501 could also be set by an appropriate servo-actuated or electronically actuated controlled system. Pressure gauge 509 provides an indication of the pressure at pressure relief valve 501.

Pressure reducer 510 is provided to assist in appropriate control of system pressure, and hydraulic accumulator 511, as is known in the art, is provided to help maintain a constant pressure in the hydraulic circuit to enable the circuit to precisely control timing and movement of circuit elements. Various one-wave valves (check valves), and other hydraulic circuit elements may be utilized to effect appropriate control of the hydraulic circuit. Pressure relief valve 501, manual adjustment valve 508, pressure reducer 510, and other circuit elements, as appropriate, drain excess or overflow fluid or oil into reservoir 502.

As noted previously, the present invention is intended to operate with a completely separate hydraulic system and completely independent from the operational systems of the injection molding machine. However, in order to ensure proper and complimentary operation of the systems, various interlock signals are configured to be provided between the injection molding machine and the mold system to signal intermediate clamp positions, final clamp positions, and mold open positions. It is also within the scope of the invention to utilize the hydraulic circuits and hydraulic systems of the injection molding machine, utilizing hydraulic lines 301 to make the appropriate interconnections.

The above-discussed embodiment of the invention is for illustrative purposes only, and is not intended to limit the scope of the invention. For example, although the above-referenced embodiment of the invention is directed to a configuration wherein a completely separate hydraulic circuit, including hydraulic pump 503, reservoir 502, and hydraulic lines 301 are utilized, it is also within the scope of the invention to utilize the hydraulic circuit of a conventional injection molding machine, and merely tapping into the appropriate hydraulic lines utilizing hydraulic lines 301. Additionally, the disclosed configuration of the invention illustrates a separate coining controller 504, control panel 505, and display panel 506. It is within the scope of the invention, however, to combine one or more of these elements with existing elements on a conventional injection molding machine, to take advantage of available levels of integration. For a complete understanding of the metes and bounds of the present invention, reference should be made to the appended claims.

What is claimed is:

1. A method of injection molding thermoplastic parts, said method comprising the steps of:

providing a movable mold half to be mounted on a movable platen of an injection molding machine, said movable mold half including a B-half parting line plate and at least one movable mold insert surface thereon;

providing a stationary mold half to be mounted on a stationary platen of the injection molding machine, said stationary mold half including a hydraulic cylinder plate which is configured to be fixedly attached to the stationary platen, at least one stationary mold insert fixedly attached to the hydraulic cylinder plate, and an A-half parting line plate movable with respect to said hydraulic cylinder plate by a moving device, said moving device linearly varying a distance between the A-half parting line plate and the hydraulic cylinder plate, wherein a movement of the A-half parting line plate is controlled by a control circuit;

attaching the movable mold half to the movable platen of the injection molding machine;

attaching the hydraulic cylinder plate of the stationary mold half to the stationary platen of the injection molding machine;

extending the moving device of the stationary mold half so that the A-half parting line plate is extended by a predetermined distance away from the hydraulic cylinder plate;

moving the movable platen of the injection molding machine toward the stationary mold half until the B-half parting line plate contacts the A-half parting line plate, thereby creating an expanded mold cavity between the at least one movable mold insert surface and a surface of the at least one stationary mold insert;

injecting a predetermined percentage of an injection shot of molten material into a runner system formed by the movable mold half and stationary mold half, said predetermined percentage of the injection shot traveling through the runner system and into the expanded mold cavity, further moving the movable mold half in such a way as to decrease the predetermined distance between the A-half parting line plate and the hydraulic cylinder plate; and injecting a remaining percentage of the injection shot into the injection cavity, wherein upon completion of the movement of the movable mold half the injection cavity has reached a final cavity size, and the mold insert surfaces have reached a final clamp position;

cooling the molten material in the mold cavity; and removing a molded part from the injection cavity.

2. A method as recited in claim 1, said method including a step of sensing a movement of the A-half parting line plate relative to the hydraulic cylinder plate.

3. A method as recited in claim 1, said method including a step of controlling a movement of the A-half parting line plate with respect to the hydraulic cylinder plate by controlling a hydraulic pressure in a hydraulic circuit connected to the hydraulic cylinder plate while sensing a relative position of the A-half parting line plate with respect to the hydraulic cylinder plate.

4. A method as recited in claim 1, wherein said predetermined percentage of the injection shot comprises approximately 93–96%.

5. A method as recited in claim 1, wherein the remaining percentage of the injection shot and the predetermined percentage of the injection shot equals 100%.

6. A method as recited in claim 1, wherein said step of injecting the remaining percentage of the injection shot is performed simultaneously with the step of further moving the movable mold half in such a way as to decrease the predetermined distance between the A-half parting line plate and the hydraulic cylinder plate.

7. A method as recited in claim 1, wherein said step of injecting the remaining percentage of the injection shot is performed after the step of further moving the movable mold half in such a way as to decrease the predetermined distance between the parting line plate and the hydraulic cylinder plate.

8. A method as recited in claim 1, wherein said step of moving the movable platen includes a step of applying a counterpressure on a hydraulic system associated with the A-half parting line plate and the hydraulic cylinder plate, and wherein the step of further moving the movable mold half includes a step of venting the counterpressure in the hydraulic circuit, thereby allowing hydraulic pistons associated with the stationary mold half to collapse, enabling movement of the A-half parting line plate toward the hydraulic cylinder plate by the movable platen.

9. A method as recited in claim 8, wherein said relieving of said pressure in said hydraulic circuit includes opening a pressure relief valve when the pressure in the hydraulic circuit exceeds a preset pressure threshold of the pressure relief valve.

\* \* \* \* \*